(No Model.)
A. HERZ.
BROILER.
No. 570,754.   Patented Nov. 3, 1896.
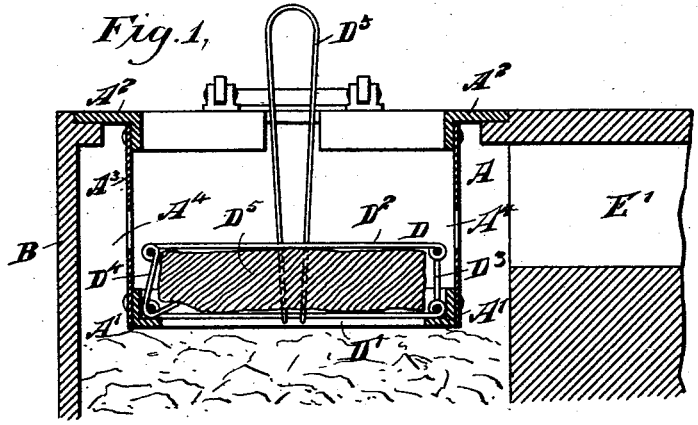
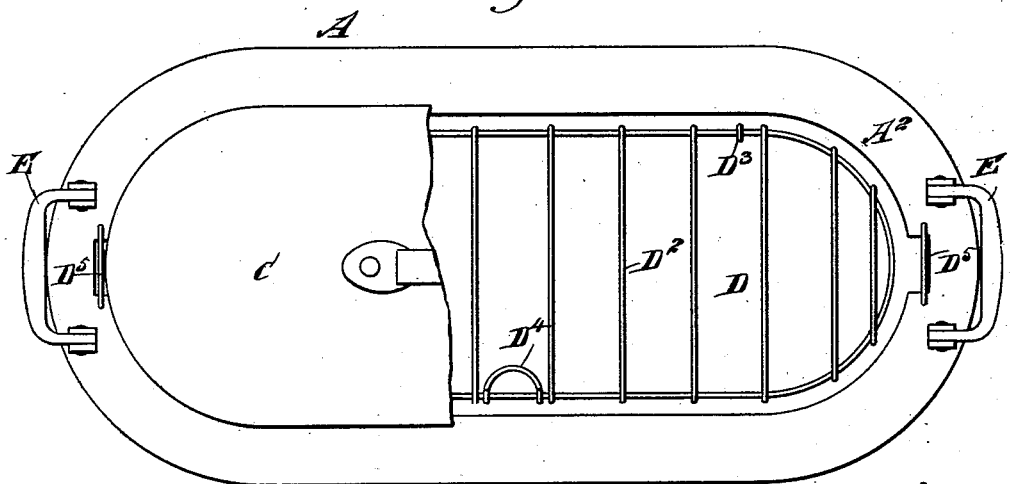
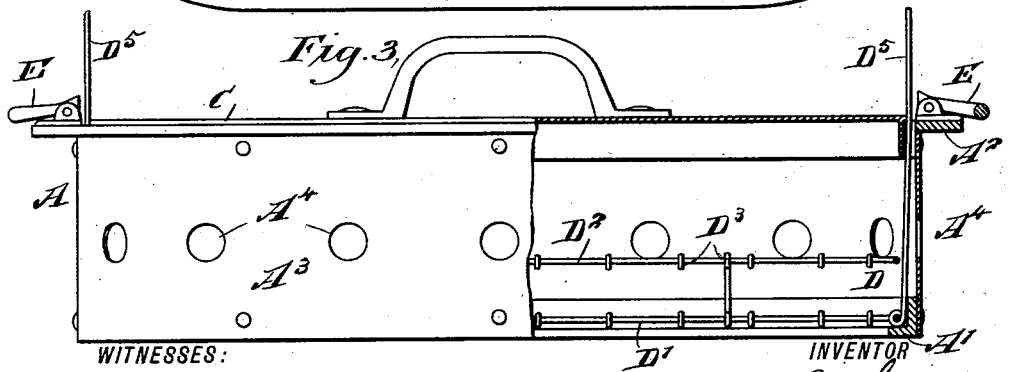
WITNESSES:
Edward Thorpe
F. W. Hanaford
INVENTOR
A. Herz
BY
ATTORNEYS.

UNITED STATES PATENT OFFICE.

ALFRED HERZ, OF NEW YORK, N. Y.

BROILER.

SPECIFICATION forming part of Letters Patent No. 570,754, dated November 3, 1896.

Application filed August 12, 1896. Serial No. 602,567. (No model.)

*To all whom it may concern:*

Be it known that I, ALFRED HERZ, of New York city, in the county and State of New York, have invented a new and Improved Broiler, of which the following is a full, clear, and exact description.

The object of the invention is to provide a new and improved broiler which is simple and durable in construction, adapted to be conveniently placed in position over the burning fuel in a kitchen-stove, and arranged to carry off all fumes arising during the broiling process, and without danger of deadening the fire.

The invention consists of certain parts and details and combinations of the same, as will be fully described hereinafter and then pointed out in the claim.

Reference is to be had to the accompanying drawings, forming a part of this specification, in which similar characters of reference indicate corresponding parts in all the figures.

Figure 1 is a cross-section of the improvement as applied. Fig. 2 is a plan view of the improvement with parts broken out, and Fig. 3 is a side elevation of the same with parts broken out.

The improved broiler is provided with a casing A, consisting of a bottom ring $A'$, L-shaped in cross-section, a similarly-shaped top ring $A^2$, and a side wall $A^3$, connected to the vertical flanges of said rings $A'$ $A^2$, as plainly indicated in Figs. 1 and 3, said side wall being preferably of sheet metal and formed with apertures $A^4$ for the escape of the fumes arising during the broiling operation.

The casing A extends into the fire-box B of the kitchen-stove, and the said casing is supported from the top of the stove by the horizontal flanges of the top ring $A^2$, as shown in Fig. 1, so that the casing is suspended in the fire-box and the burning fuel therein has free access to the bottom and sides of the casing. A lid C is adapted to close the top of the casing A, and the ring $A'$ supports with its horizontal inwardly-extending flange a grate D, preferably made reversible and supporting the meat $D^5$ or other article to be broiled.

The grate D is provided with two grate-sections $D'$ $D^2$, placed one above the other a suitable distance apart to receive the meat between the two grate-sections, which connect with each other at one side by hinges $D^3$, and the free ends are adapted to be locked together by a suitable catch $D^4$. On the ends of one of the sections are hinged upwardly-extending handles $D^5$, adapted to pass through recesses cut in the ring $A^2$ to project a suitable distance above the top of the casing to permit the operator to conveniently remove the grate D from the casing A and to reverse the grate and place it back into position in the casing, so that the meat is broiled on both sides without the operator being compelled to remove the casing or to turn the meat over with a fork or the like.

The top of the ring $A^2$ is provided near its ends with suitable handles E for conveniently placing the casing in position in the stove or removing it therefrom, as the case may be.

Now it will be seen that when it is desired to use the device the operator places the meat or other article to be broiled between the grate-sections and locks the said sections together with the catch $D^4$. The grate containing the meat is then lifted by the handles $D^5$ and placed in position in the casing A, and the latter is then taken hold of by the handles E and put in position on the stove, as previously explained. The lid C is then placed in position to close the casing at the top. It is evident that the burning fuel in the fire-box B reaches the meat contained in the reversible grate D, so as to broil the same, and the fumes arising during the broiling operation can readily pass through the openings $A^4$ into the draft-flue $E'$ of the kitchen-stove to be carried to the chimney, and consequently no undesirable fumes escape into the kitchen.

It will further be seen that by the arrangement described the stove-hole is completely closed, and consequently the draft of the stove is not interfered with, so that the fuel will keep on burning without danger of being deadened from lack of draft.

When it is desired to reverse the position of the meat, then the operator removes the cover C, takes hold of the handles $D^5$, and lifts the grate out of the casing and instantly reverses it by turning the handles over and then replaces the grate in position in the casing A and closes the casing by the cover C to permit of broiling the meat on the other side—that is, the side nearest the fire. When the broiling operation is finished, the lid C is again removed and the grate is lifted from the casing and the meat removed from the grate. Another piece of meat can then be broiled without removing the casing from the stove.

This broiler (which can also be used as a toaster) is a necessity, especially for ranges which have water-backs, as in the small-sized water-back ranges it is impossible to even broil or toast a small piece of meat or bread without the operator standing a good chance of being burned. Moreover, this broiler is especially useful, as in the latest patterns of stoves the manufacturer has not in any way provided for the wants of broiling or toasting.

Having thus described my invention, I claim as new and desire to secure by Letters Patent—

A broiler having a casing formed of a ring having a horizontal and vertical portion, the horizontal portion forming a flange adapted to rest on the top of the stove and the casing also having a perforated side wall secured to the vertical portion of the ring and carrying at its lower portion a second and internally-located ring with an inwardly-extending horizontal flange, a grate consisting in two sections pivotally connected with each other and in a handle pivoted to each end of the grate, the grate fitting snugly within the casing and resting on the flange of the internal ring and the handles of the grate extending upwardly through recesses in the first-named ring of the casing, and a cover for the casing, the cover fitting over and closing the upper side thereof and holding the handles of the grate in vertical position, substantially as described.

ALFRED HERZ.

Witnesses:
A. A. HOPKINS,
E. B. MARSHALL.